United States Patent
Bourgoin et al.

[11] Patent Number: 5,854,679
[45] Date of Patent: Dec. 29, 1998

[54] OBJECT CHARACTERISTICS MEASUREMENT SYSTEM

[75] Inventors: Jean-Pierre Bourgoin; Jean-Michel Jacquot, both of Bourges; Patrick Connan, La Chapelle Saint Ursin; Benoît Fle, Vignoux Sous les Aix, all of France

[73] Assignee: Aerospatiale Societe Nationale Industrielle, Paris, France

[21] Appl. No.: 969,460

[22] Filed: Nov. 13, 1997

[30] Foreign Application Priority Data

Nov. 15, 1996 [FR] France .................................. 96 13962

[51] Int. Cl.⁶ .................................................. G01B 11/00
[52] U.S. Cl. .......................... 356/372; 356/379; 356/380
[58] Field of Search .................................. 356/372, 379, 356/380, 383, 384, 385, 376

[56] References Cited

U.S. PATENT DOCUMENTS

| | | | |
|---|---|---|---|
| 4,063,820 | 12/1977 | Borgese | 356/167 |
| 4,152,767 | 5/1979 | Laliotis | 364/560 |
| 4,205,973 | 6/1980 | Ryan | 65/29 |
| 5,515,159 | 5/1996 | Sites et al. | 356/237 |
| 5,570,190 | 10/1996 | Fumikazu et al. | 356/400 |
| 5,612,786 | 3/1997 | Huber et al. | 356/376 |
| 5,627,647 | 5/1997 | Baan et al. | 356/372 |

FOREIGN PATENT DOCUMENTS

| | | |
|---|---|---|
| 2710563 | 4/1995 | France . |
| 2 078 937 | 1/1982 | United Kingdom . |
| 2 236 850 | 4/1991 | United Kingdom . |

*Primary Examiner*—Frank G. Font
*Assistant Examiner*—Roy M. Punnoose
*Attorney, Agent, or Firm*—Burns, Doane, Swecker & Mathis, LLP

[57] ABSTRACT

This invention relates to a system for measuring the characteristics of an object, comprising: a least two cameras (18, 19) pointing along two different directions towards the space in which the object (23) is positioned located above the upper plane of the first light box, and connected to the processing unit. two light boxes (11, 12), the first being located in a upper horizontal plane above the platform of scales (10), the second being located in a vertical plane above and to the side of the plane above the first plane; a processing unit (13) connected firstly to an information input device (14) and secondly to a display device (15); scales (10) equipped with a weighing platform.

9 Claims, 9 Drawing Sheets

OBJECT CHARACTERISTICS MEASUREMENT SYSTEM

TECHNICAL FIELD

This invention relates to a system for measuring the characteristics of an object.

The field of the invention is fast and precise measurement of the characteristics of an object, for example a package, and particularly the measurement of its three overall dimensions.

STATE OF PRIOR ART

A number of publications have been made in the state of prior art thus defined, and particularly:

a French patent application FR-A-2,672,119 that describes a system for the measurement of surfaces in three dimensions to be represented mathematically. This system comprises a machine used to measure a surface in three dimensions, optical devices designed to generate an image of the said surface, these optical devices being capable of being displaced and oriented, and processing units connected to the optical devices and designed to measure the coordinates of points on the surface to be measured;

a French patent application FR-A-2,720,155 that describes a three dimensional process and device for fast and precise measurement of large objects such as vehicles. This process includes a step in which the measurement position of a shape measurement sensor are determined approximately, a step in which the sensor is positioned in sequence at each measurement point to record the shape of parts of the surface of the object, the parts of the surface being represented by points on the object whose coordinates are expressed in a coordinate system related to the sensor, a step in which the sensor positions are identified precisely at the positions determined approximately in a fixed predetermined coordinate system and a step in which the coordinates of the points on the surface expressed in the sensor local coordinate system are transformed into coordinates expressed in the fixed coordinate system as a function of the identified positions of the sensors;

a French patent application FR-A-2,710,563 that describes an installation to continuously identify and weigh a package the label of which includes a bar code, consisting of a sequence of at least three endless conveyors, which are fitted with the following near the interstice between the first and the second conveyor:

a first set of cells laid out in a plane parallel to the package advance plane;

a second set orthogonal to the first;

in which the scales platform measures the package weight as it moves forwards on the second conveyor and sends this information to the processing unit; and in which the second and third conveyors are driven continuously and synchronously.

But there are many disadvantages in the systems described in the various applications. Thus the first application describes a system that uses touch sensitive sensors and describes a measurement process that is complicated to implement. The second application describes a system that uses ultrasound transducers that may be disturbed by the ambient industrial environment, and a measurement process that is complicated to use. The third application does not have the same purpose as the application in the invention, but may be complementary to it.

There may be severe constraints in the environment in which the system according to the invention is used:

temperature from −15° C. to +50° C.;

relative humidity of almost 100% under some usage conditions;

protection of the electrical network that may be disturbed by large handling machinery;

the machine may be moved in workshops or to other sites, protection against excessive vibrations during transport in alleys or between different sites.

The purpose of the invention is a system that can simplify systems according to prior art, in particular by measuring the shape of arbitrary objects within less than two seconds in order to build up or modify a database that may be in a remote location.

DESCRIPTION OF THE INVENTION

The invention proposes a system for measuring the characteristics of an object, characterized in that it comprises:

scales equipped with a weighing platform;

two light boxes, for example two diffusing screens lit by at least one light source, the first being located in a upper horizontal plane above the said platform, the second being located in a vertical plane above and to the side of the plane above the first light box;

a processing unit connected firstly to an information input device and secondly to a display device;

at least two cameras pointing along two different directions (for example at 90°), towards the space in which the object is positioned located above the upper plane of the first light box, and connected to the processing unit.

Advantageously, the system according to the invention also comprises a bar code reader.

Advantageously, a cross bar is drawn on each diffuser screen. The cameras may be fixed to a portal frame. The processing unit comprises a system unit, a floppy disk drive, a hard disk, an image acquisition and processing card, a connection card and a video card. This system may be placed on a table fitted with rollers.

In a alternate embodiment, the system according to the invention comprises a conveyor belt on which the object is placed, and a photoelectric cell connected to the processing unit.

The system according to the invention may beneficially be used to add to or modify a database.

The two light boxes have the advantage that they can eliminate problems caused by the roughness of an object, for example such as a package, by making images seen by the cameras appear uniform and thus avoiding false measurements.

The system according to the invention has the advantage that it is a contact-free system, so that a fast measurement time is possible. The system according to the invention can measure the characteristics of objects with arbitrary shapes in less than two seconds in order to add to or modify a database that may be in a remote location.

The system according to the invention has the advantage that it is a passive system undisturbed by the surrounding industrial environment.

In the system according to the invention, measurements of dimensions, weights and the bar code identification may advantageously be carried out by a single independent machine.

The system according to the invention also has the advantage that it enables access to all possible databases.

The system according to the invention may be used in many different fields, for example:

express parcel transport, shipment of parcels;

logistic services (stock management, storage, handling, warehouses, etc.);

packaging;

order preparation;

mail order;

wholesale trade (distribution of pharmaceuticals and cosmetics);

inspection and measurement, metrology, calibration.

DETAILED DISCLOSURE OF EMBODIMENTS

Figure 1:
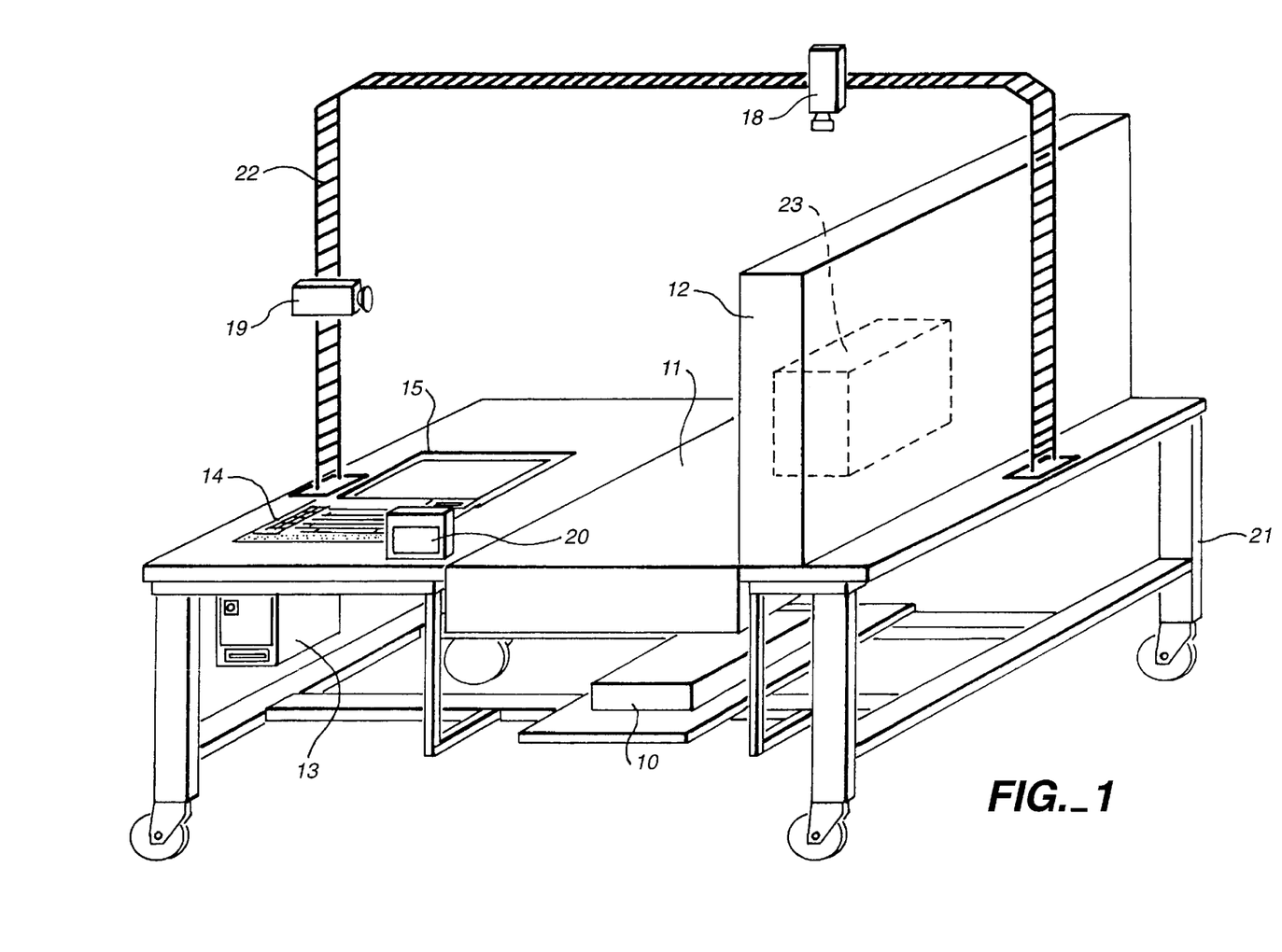
FIGS. 1 and 2 illustrate the system according to the invention.

As shown in FIG. 1, the system according to the invention comprises:

scales 10 equipped with a weighing platform;

two light boxes 11 and 12, each composed of a diffusing screen lit by at least one light source, the first being placed in a upper horizontal plane above the platform of scales 10, the second being placed in a vertical plane above and to the side of the upper plane of the first;

a processing unit 13 connected firstly to an information input device, for example a membrane keyboard 14, and secondly to a display device or screen 15;

at least two cameras 18 and 19 located along two different directions, for example orthogonal, directed towards the space located above the upper plane of the first light box 11 and connected to the processing unit 13;

possibly a bar code reader 20.

In the embodiment shown in FIG. 1, the system according to the invention is placed on a table 21 fitted with rollers, so that it can be displaced to suit the user's needs, and cameras are fixed on a portal frame 22.

The light boxes are essential for the system according to the invention. They overcome problems related to the texture of the object to be measured 23. Cameras thus see the objects with back lighting. The contrast is thus maximum regardless of the color of the object (even white), avoiding problems related to the presence of labels, color strips, marking, etc. The cameras see everything as black on a white background.

Figure 2:
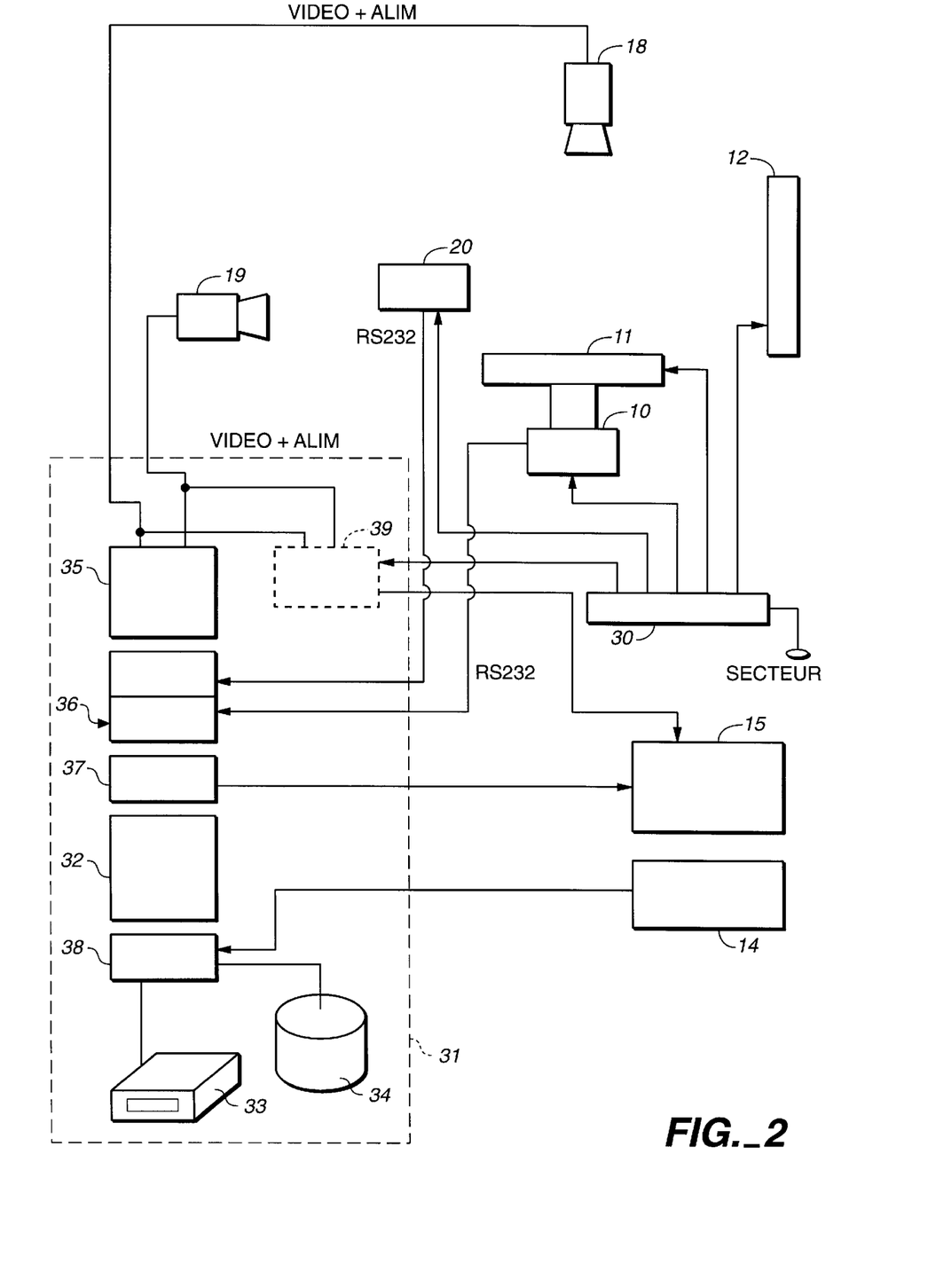
Figure 3:
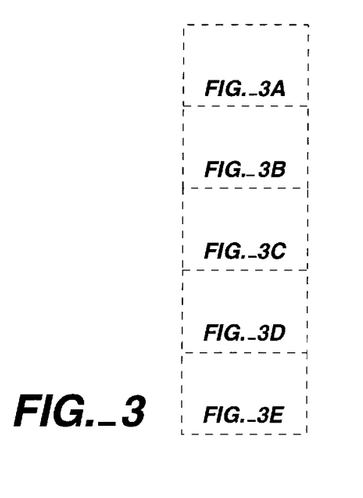
FIGS. 3A to 3E illustrate an organization chart for operation of the system according to the invention.
Figure 3A:
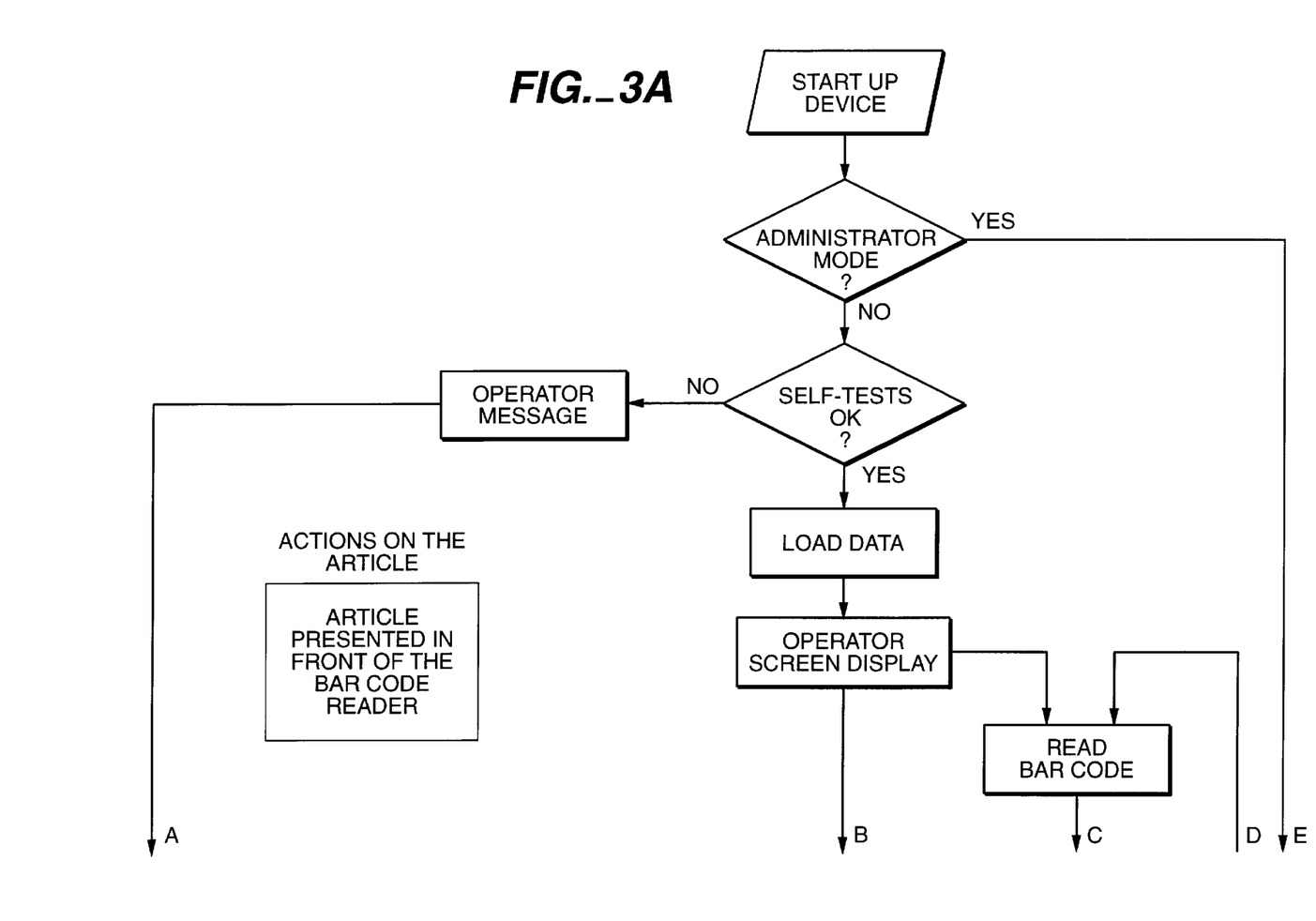
Figure 3B:
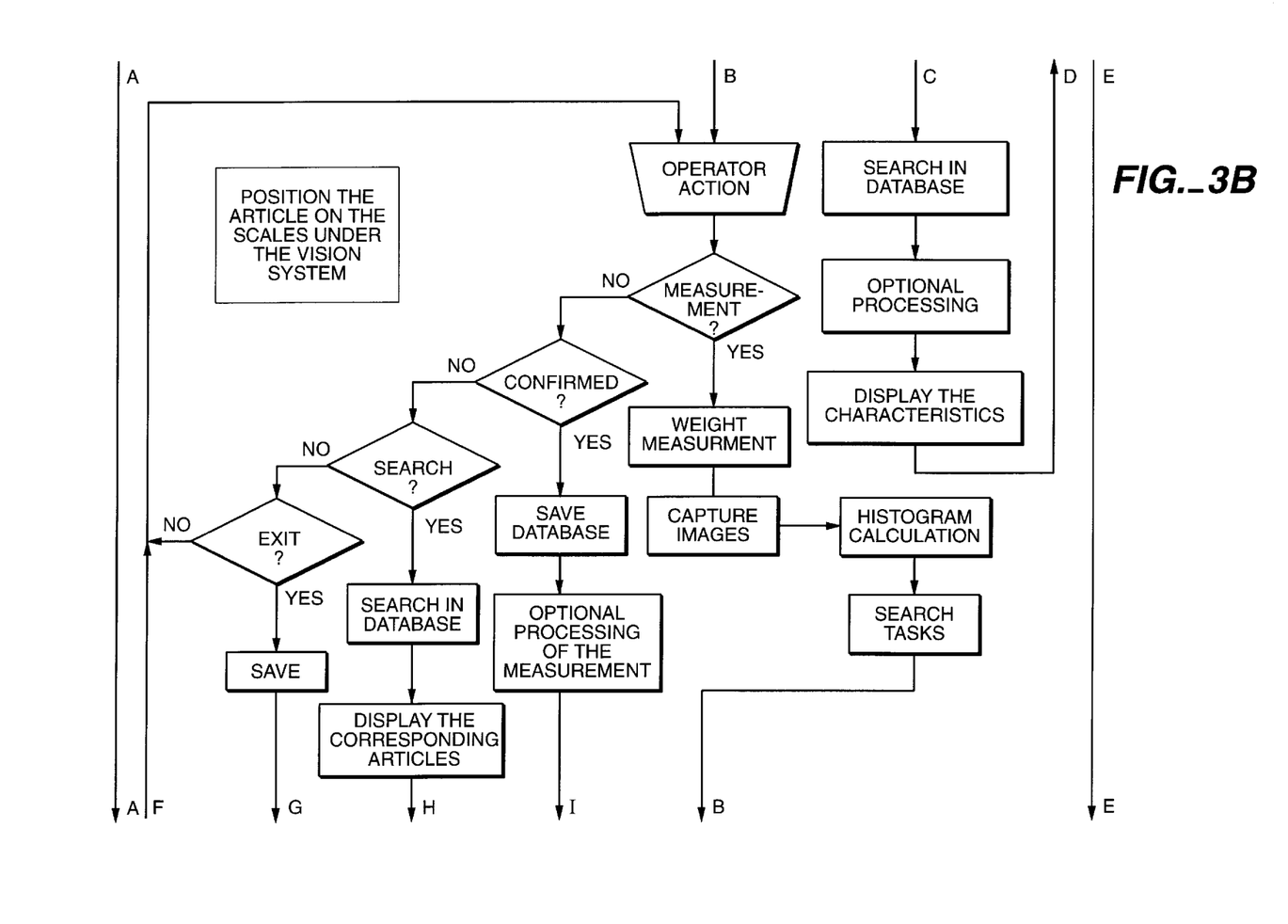
Figure 3C:
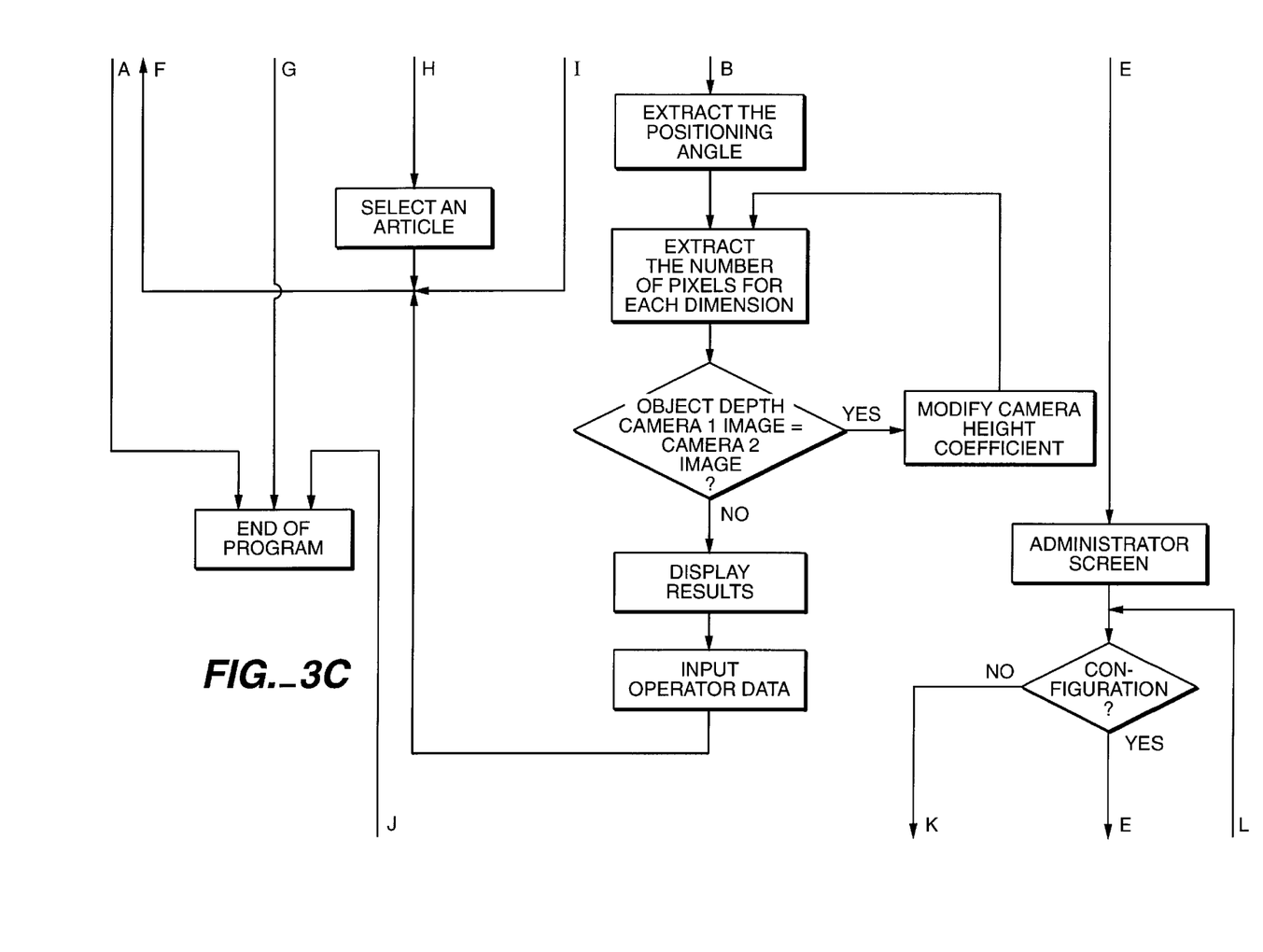
Figure 3D:
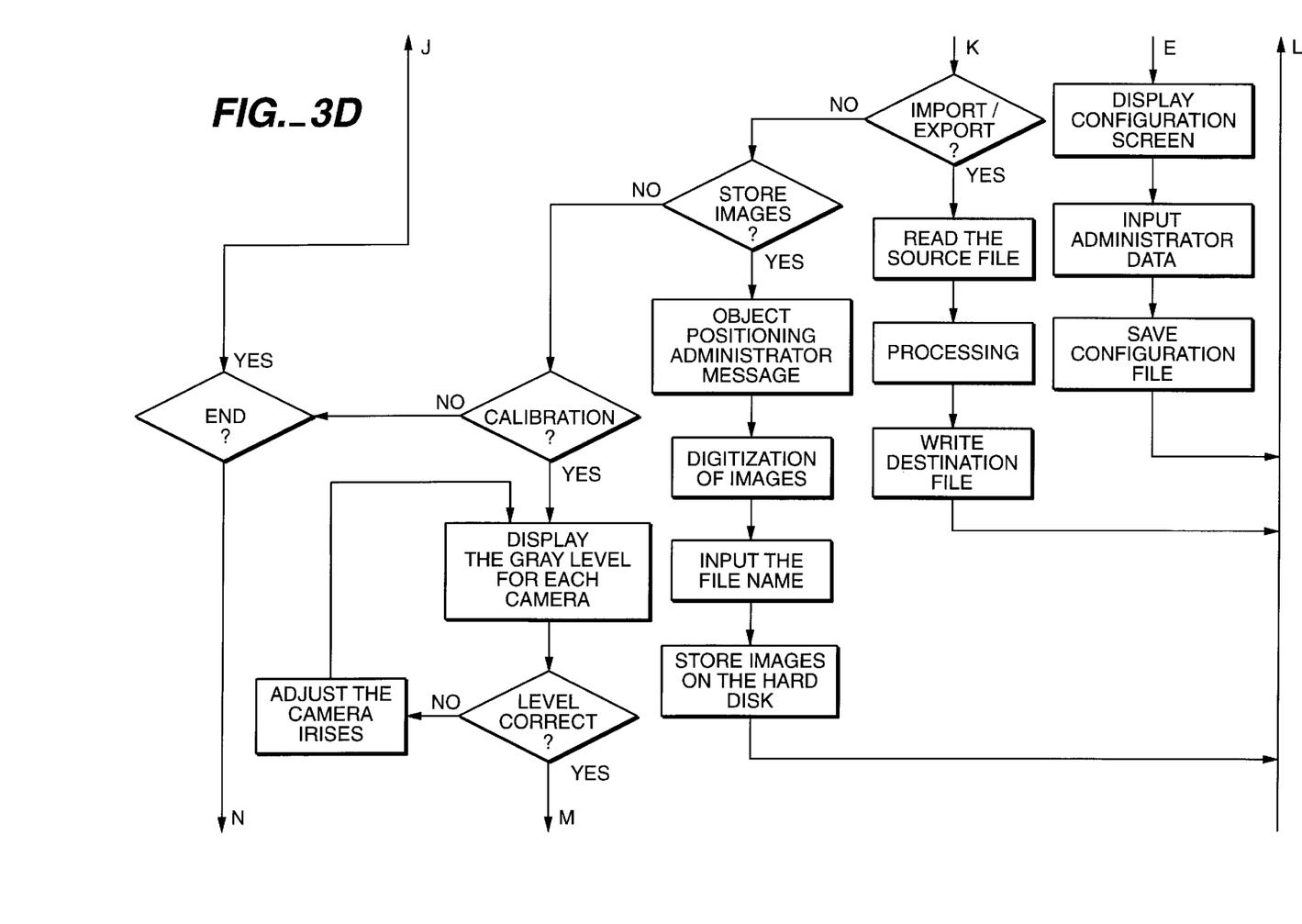
Figure 3E:
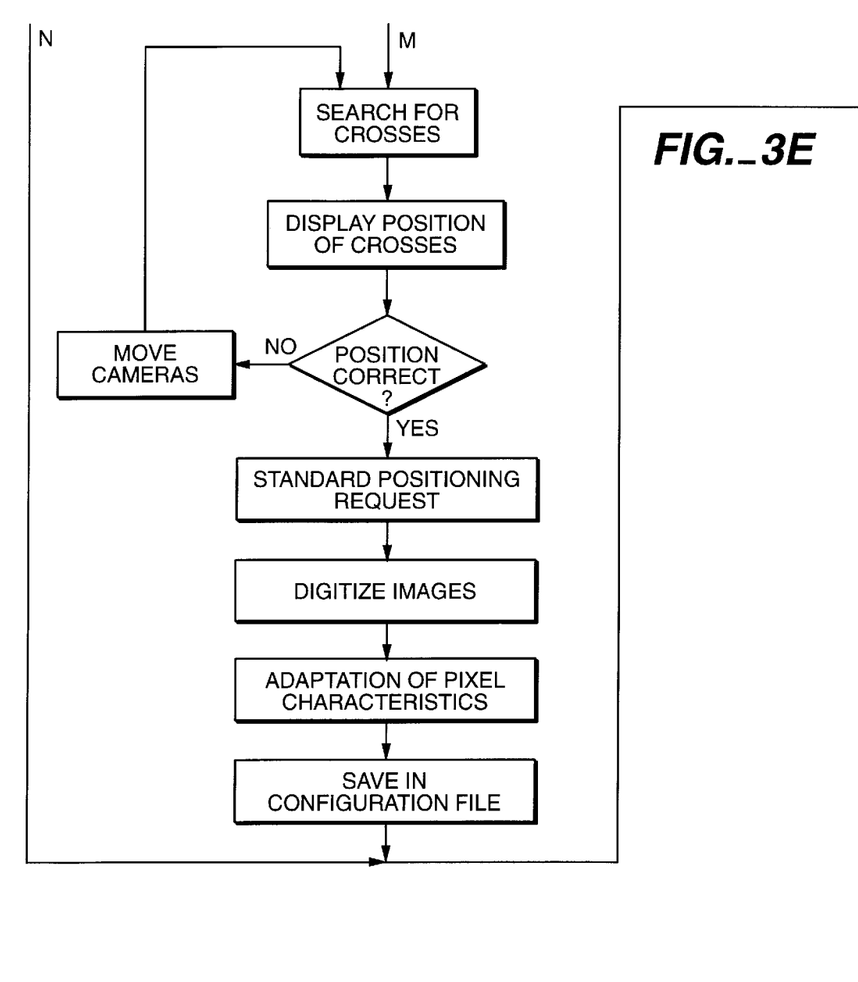

FIG. 2 illustrates the architecture of the system according to the invention. The elements, already shown in FIG. 1, are illustrated in this Figure with the same reference. FIG. 2 also shows a distribution strip 30, and an industrial rack (or box) 31, which contains in particular a processing unit or CPU 32, or floppy disk drive 33, a hard disk 34, an image acquisition and processing card 35, a communications card 36, a video card 37, a peripherals management card 38 and a power supply 39.

The system according to the invention can thus build up a database comprising:

three-dimensional measurements of an object (with its side dimension varying from a few millimeters to a few meters) with or without packaging, with shapes other than a parallelepiped, for example plastic bags, etc.; (in this case the machine gives the maximum dimensions), the shapes possibly having holes at the center, labels may be glued, even around the periphery, and the colors of objects may vary;

the weight measurement limited only by the type of scales used; the base is the scales platform;

an identifier, if there is one in the form of a bar code, is read manually using a light pen. Otherwise the information is input to the software using the keyboard.

In one example embodiment, the system according to the invention is composed of four hardware assemblies:

a mechanical module which supports the other four modules and comprises a table 21 with rollers to facilitate its displacement. The upper part is composed of a portal frame 22 supporting the two video cameras;

a dimensional calculation module, consisting of two cameras 18 and 19, the acquisition and processing card 35 using a 32-bit library, and software giving the characteristics of the analyzed objects;

a communication module consisting of an RS232 communications card on an ISA bus, to collect weight and identification information;

a calculation module consisting of a CPU 32, for example a Pentium 120 MHz PCI equipped with 32 Mbytes of DRAM, a 1.44 Mbyte floppy disk drive 33, a 1.2 Gbyte hard disk 34, and a PCI 16-bit VGA/SVGA video display card 37. The CPU board 32 is equipped with a parallel interface for outputs.

The latter three assemblies are inserted in a six-slot industrial minirack with a 200 Watt power supply fixed under the working surface.

The light boxes 11 and 12 may for example each consist of three strips of two 1.2 meter long neon tubes. The neon tube power supplies are equipped with electronic ballasts which prevent any beating due to the sampling frequency of cameras 18 and 19. Each ballast switches the 220 V/50 Hz mains power supply at 42 kHz. Camera sampling may vary from 50 Hz to 10 Hz, which will eliminate beating. Ballasts enable operation at a temperature between −15° C. and +50° C., enabling operation in an industrial environment. For example, these tubes may be of the type made by MAZDA, RBP Club 236 HFB. Each diffusing screen can give constant light regardless of the position of the object on the measurement plane. It is about 5 mm thick, and for example will be fitted 15 cm from the neons.

In the horizontal plane, a "triplex" glass pane about 7 mm thick is used to support objects to be measured. It is fixed at about 1 cm above the diffusing screen associated with the first light box 11. A cross bar is drawn on each of the diffusing screens and is used to calibrate the system. It must be smaller than the smallest object size measurable by the system.

The dimensions of table 21 could be 2.5 meters×0.8 meters. The portal frame 22 is about 1.5 m high (above the table) and about 2.5 m wide. The dimensions are controlled by the maximum dimensions to be measured and the angle of the objective used.

For example, objectives on cameras 18 and 19 have a focal length of 8 mm and an aperture angle of 34°. In this case, to measure for example packets with side dimensions of about 0.5 m, the camera would have to be at least one meter from the largest surface. The cameras 18 and 19 used may be CCD type cameras with a resolution of 752 to 582 pixels, with 256 levels of gray per pixel, for example made by SONY reference IXC075. The CCD sensor is ⅓ inch long. The sensor dimensions are H=6 mm and V=4.96 mm. The cameras are synchronized by taking instantaneous photos on the two planes.

The two images are simultaneously digitized by an image acquisition and processing card 36 of the MATROX METEOR RGB type used in PAL RGB mode. Image parameters are extracted using the MATROX MIL 32 library under Windows NT 3.51.

The bar code reader may or may not be attached to the system. The model used on the prototype is a METROLOGIC ICS 700 coupled to an RS 232 link. The use of a manual reader may also be considered, in which case the interface with the processing unit will be different.

The bar code is a function that loops on itself. The information is only used when the operator passes an object marked with the bar code in front of the reader.

If the system according to the invention is tilted, it continues to operate normally and it is only necessary to adjust the scales so that it is approximately level (a level is built into the base of the scales and adjustment parts facilitate adjustment). For example METLER TOLEDO scales reference SB 32000 may be used.

The user interface comprises:

a 14 inch SVGA screen 15, inset on the working plane;

a QWERTY 101-key industrial membrane keyboard, also inset in the working plane.

The Windows NT operating system is installed on the unit.

In one example embodiment, there are the following connections with the PC processing unit:

RS232 with the scales,

RS232 or keyboard emulation with a bar code reader;

parallel port for printouts of listings;

a keyboard for inputting packaging or identifiers;

network (optional).

The precision obtained is ±1 pixel on the measurement for objects with clearly defined edges. The precision changes as a function of the distance between the object and the objective.

The main function of the system according to the invention is to provide the dimensional characteristics of an object placed on the measurement system. These characteristics are stored in a file that will be used later.

A database, for example an ASCII or Microsoft compatible database, may be automatically filled in by the system according to the invention, or manually by the operator. It is used to extract information in order to add to other bases on other sites, or to use a storage optimization software. This software does not need to be on the measurement machine. The information may then be transported either on a diskette or through the network (a wide variety of exchange protocols may be used, and may be determined for each case individually). This database can be transformed for transfer to other systems.

In one embodiment of the system according to the invention, the objects to be measured are placed on the machine at the center of the scales for the measurements, and are then stored. When the operator validates the measurements, the packaging should be indicated (number of elements for a dimension measurement). The operator will be informed if the measurements are different from the measurements already stored in the base for a given identification code or packaging.

An object can also be measured if it is positioned in an arbitrary manner. The positioning angle is automatically detected and a recalibration is done if the angle exceeds 10°. However, in this case, the calculation time is a little longer.

A flow chart for the system according to the invention is given in FIGS. 3A, 3B, 3C, 3D and 3E.

The operator calibrates the system when it starts up. The system is then in operating condition.

The operator takes the object to be measured and positions it on the scale platform.

He then follows the instructions on the processing unit.

A buzzer and a message inform the operator that he should input the bar code if there is one, for example using a light pen.

Data to be input are simple and in most cases consist of a single letter. No special computer expertise is necessary. All operations are done standing up. The processing unit provides guidance about how to backup data on diskettes.

When the acquisition program starts, the processing unit opens a day file or continues to save measurements in the same file if the date has not changed.

Four possibilities are available:

start dimension recognition;

start a self test of the machine;

start machine calibration;

configure the machine (measurement units, texts of some input fields, etc.).

Figure 4:
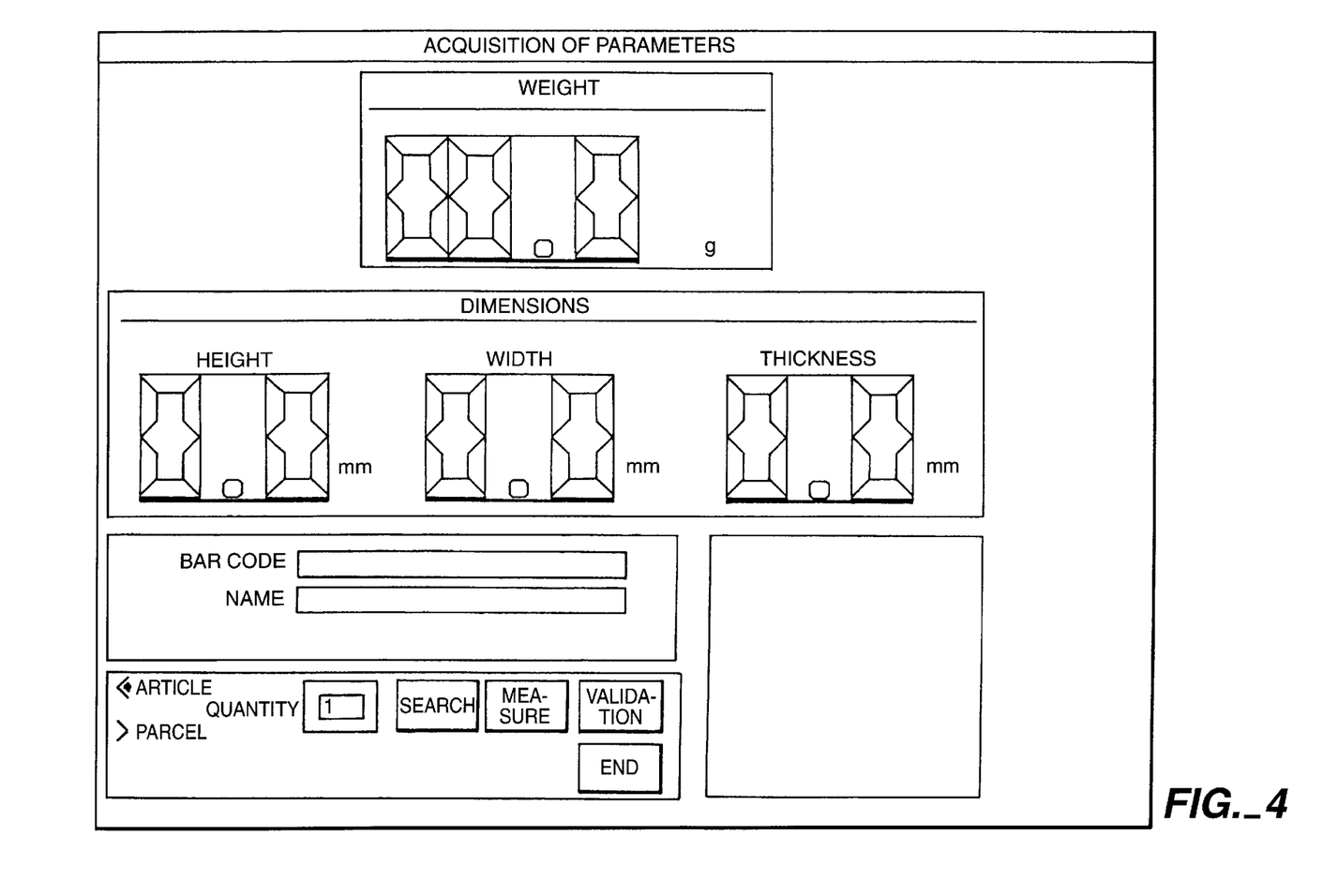
FIG. 4 illustrates an example display of the screen in the system according to the invention.

Simply follow the instructions of the cursor moving about on the screen. An example display of the screen for the system according to the invention is shown in FIG. 4.

Press the Tare function when there is no object on the scales. The Measurement function key is pressed to start a measurement, and the package is then placed on the platform; an input key is pressed to start measurements of the package weight and its three dimensions. If the results appear absurd, the Error function key is pressed and measurements are restarted. The program will accept input of two description texts, for example containing 40 characters and a bar code using a laser pen, or manually if necessary.

The system then saves the values thus measured on the hard disk.

A database can be accessed, since the working environment uses Windows NT.

The application can thus:

preload a database containing the entire article file. Each record is in ASCII format and comprises in particular:

the computer identifier of the article (disk address), the professional identifier of the article (bar code), its description, the three dimensions of the individual article, the three dimensions of the standard packaging for the article (x units in each box);

input the article identifier from a bar code reader (keyboard emulation) or the keyboard;

display the record corresponding to the article that was identified, after the input;

measure an article;

measure the standard packaging of an article;

weigh one or several articles. If several articles are weighed, the average weight of these articles will be calculated automatically;

extract information updated in the database and store them on a diskette.

The values thus measured are saved on the hard disk, and then transferred on diskette when requested by the operator.

The man/machine interface may be very simple and easy to use (used by a large number of unqualified personnel).

Links with other processing units take place by:

database exchanges (addition, modification, deletion, etc.) using a diskette or the network;

by printing a listing as a function of simple criteria (makes, types, products, dimensions, etc.).

There are many possible applications of the system according to the invention, for example:

packaging of unpackaged articles, with respect to a database of available cardboard boxes;

storage of packages in a given space (for example a delivery vehicle or a warehouse, etc.).

Figure 5:
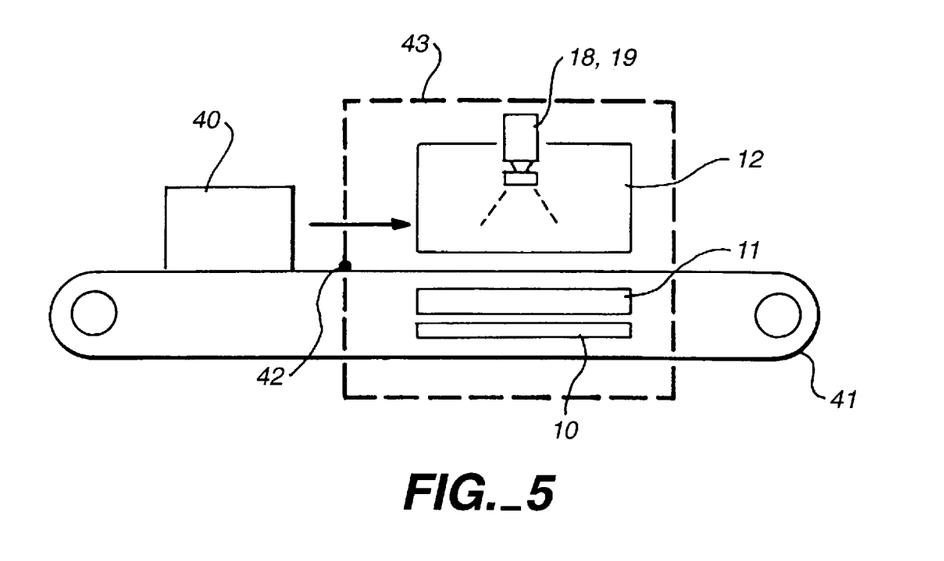
FIG. 5 illustrates an alternative embodiment of the system according to the invention.

The system according to the invention may be coupled with an object conveying system. One schematic embodiment example is shown in FIG. 5. Objects 40 (reference 23 above) transported on a conveyor belt 41 pass in front of a photoelectric cell 42 that controls the start up of the system according to the invention 43, comprising the various elements described above, and particularly the light boxes 11 and 12, cameras 18 and 19 and scales 10.

We claim:

1. System for measuring the characteristics of an object, comprising:

scales fitted with a weighing platform;

two light boxes, the first being placed in a upper horizontal plane above the scales platform, the second being placed in a vertical plane above and to the side of the upper plane of the first light box;

a processing unit, connected firstly to an information input device and secondly to a display device;

at least two cameras facing the object positioning space from two different directions located above the upper plane of the first light box and connected to the processing unit wherein one camera is directed towards one of the light boxes and the other camera being directed towards the other light box.

2. System according to claim 1, in which a light box is composed of a diffusing screen lit by at least one light source.

3. System according to claim 2, in which a cross bar is drawn on each diffusing screen.

4. System according to claim 1, in which the cameras are at an angle of 90° from each other.

5. System according to claim 1, in which the processing unit comprises a central processing unit, a floppy disk drive, a hard disk, an image acquisition and processing card, a communications card and a video card.

6. System according to claim 1, comprising a bar code reader.

7. System according to claim 1, which is placed on a mobile table on rollers.

8. System according to claim 1, comprising a conveyor belt on which the object is placed, and a photoelectric cell connected to the processing unit.

9. System according to claim 1 used to add to or modify a database.

* * * * *